3,020,896
CYLINDER HEAD WITH AIR INTAKE PASSAGES
Siegfried Meurer, Klaus Wiebicke, Horst Lachmann, and Georg Dusold, all of Nurnberg, Germany, assignors to Maschinenfabrik Augsburg-Nurnberg A.G., Nurnberg, Germany
Filed Aug. 3, 1960, Ser. No. 47,242
Claims priority, application Germany Aug. 7, 1959
4 Claims. (Cl. 123—30)

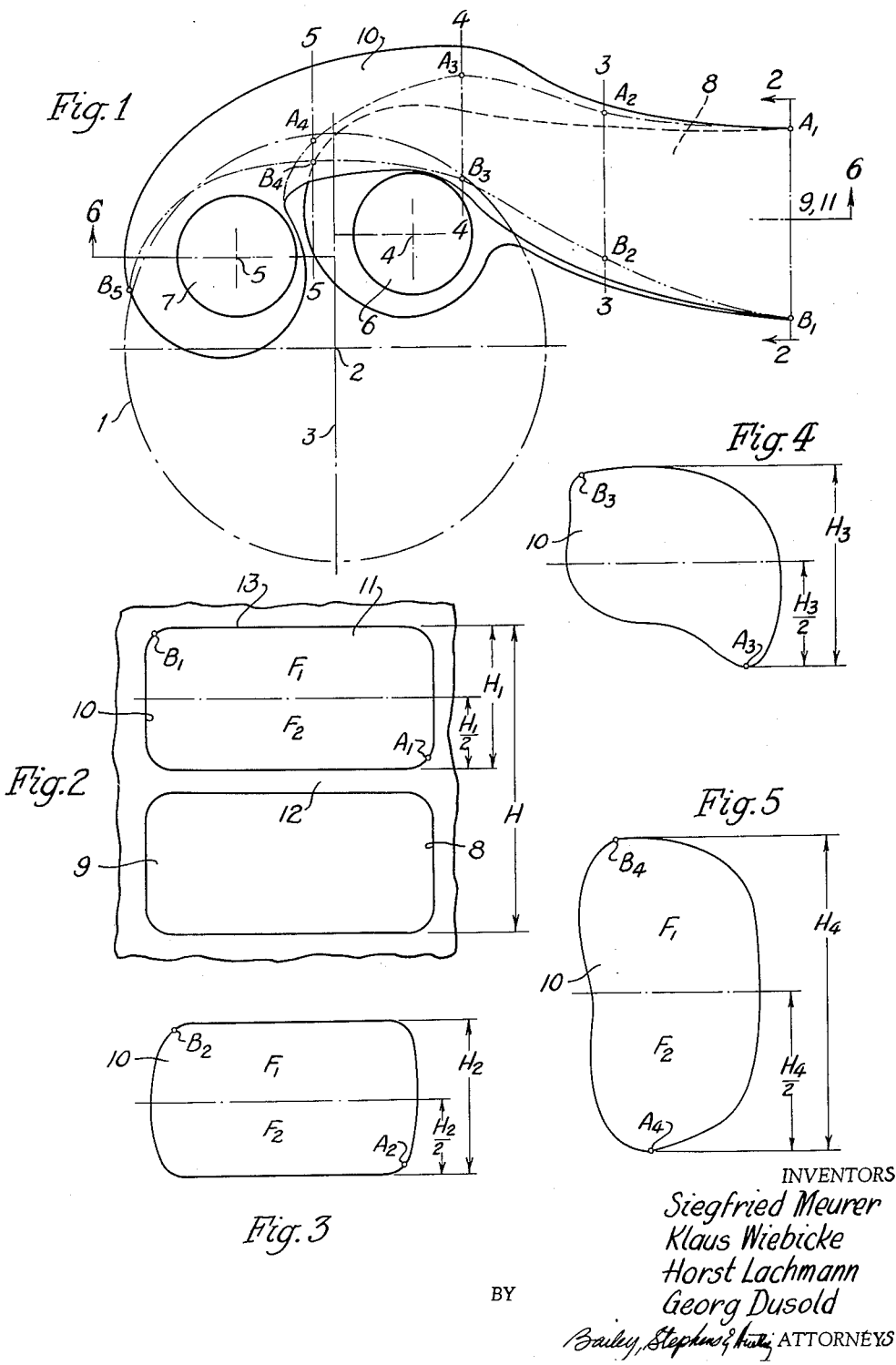

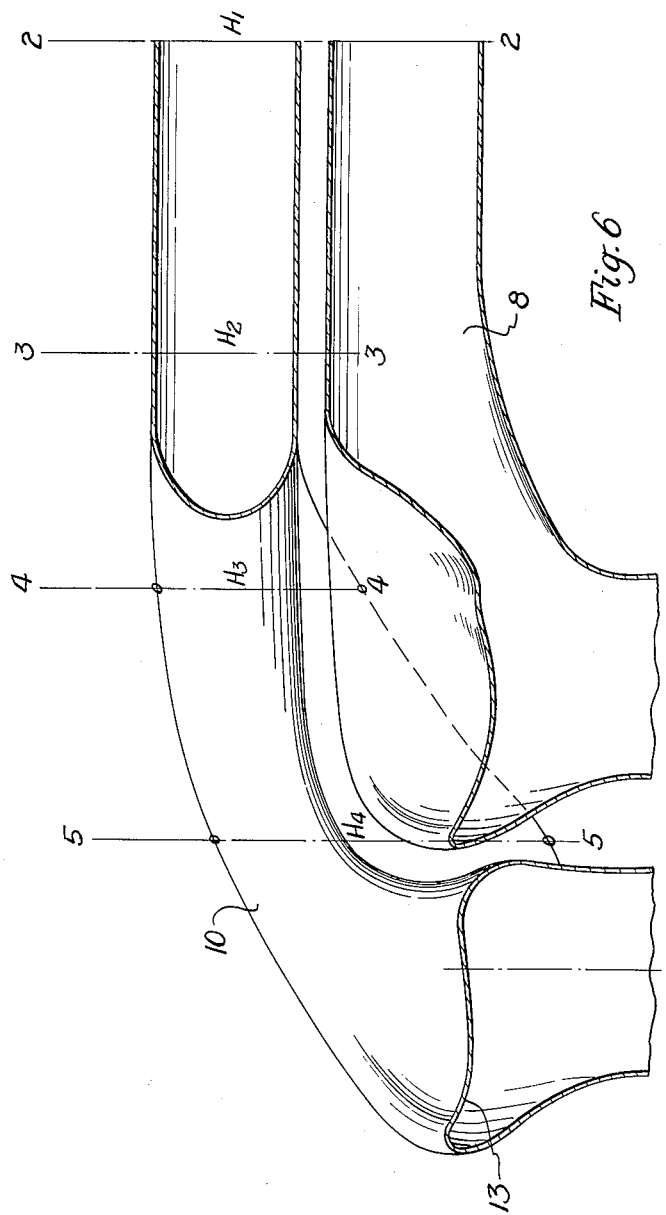

This invention relates to a cylinder head for a self-ignition engine. In particular, this invention is directed to a cylinder head having two air intake valves for each cylinder and two air intake ducts or passages leading to each valve, respectively. These air passages are for the purpose of producing a unidirectional air swirl around the longitudinal axis of the engine cylinder in an engine constructed and operated as shown in the patent to Meurer et al. No. 2,907,308. The invention is particularly advantageous in engines in which the angle between the centers of the two valves and the longitudinal axis of the cylinder lies between 45 and 90°.

Heretofore, masked valves were used for producing the necessary unidirectional air swirl in cylinders for engines having two or more air intake valves per cylinder. Such valves required special attachments in order to hold the mask in the desired position. Also, these masks have the disadvantage of somewhat throttling the air flow through the valve opening and hinder the taking of a complete air charge into the cylinder. Moreover, masked valves are subject to irregular heat warpage due to their unsymmetrical non-uniform heating of the various portions of the valve.

Air intake ducts or passages exist which are so shaped as to produce a uniform unidirectional air swirl around the longitudinal axis of a cylinder. Up to the present, however, such air swirl passages were used only with engines that had but one intake valve for each cylinder which needed but one air swirl duct. Such an air swirl duct could be accommodated in the cylinder head without difficulty as only insignificant space allowances were needed for the other elements of the cylinder head, such as cooling water space, cylinder head bolts, and the like.

In engines having two air intake valves for each cylinder and requiring a unidirectional air swirl in the cylinder and thus requiring two air intake passages per cylinder, it has been the practice to provide one of the valves with an air swirl passage and a masked valve for the other air passage in order to get the unidirectional air swirl within the cylinder. This structure thus includes the disadvantage of having a partially throttled valve opening for one valve.

The object of this invention is to provide a two air intake valve cylinder with two air swirl passages.

In general, this and other objects are obtained by forming in the cylinder head two air swirl passages connected to the valve openings, respectively, so that the air enters the engine substantially tangentially of the cylinder wall and having at least the entrance portions of the two passages superimposed upon one another.

The two air intake valves which are positioned next to each other thus receive the intake air from two separate passageways and with the valve space around the valve stems extending so far as to leave only a cast wall of from about 3 to 7 mm. between the spaces.

The preferred feature of this invention is to form the entrance opening of each air passage of approximately rectangular cross-sectional shape of greater width than height so that the overall thickness of the cylinder head is only insignificantly increased. For producing a direction of flow in the upper passage to give an air swirl in the cylinder, the latter is gradually changed from a rectangular entrance portion to a cross-section of greater height than width at its outlet portion adjacent the valve space. In order to avoid an increase in the thickness of the cylinder head, the top wall of the upper passage is lowered with respect to the plane of the cylinder head in such a way that it partially winds around the lower air passage in the region where the lower air passage connects with its valve.

The means by which the objects of the invention are obtained are disclosed more fully with reference to the accompanying drawings, in which:

FIGURE 1 is a diagrammatic plan view of the air passages in a cylinder head;

FIGURE 2 is an end view of the entrance to the air passages as viewed on the line 2—2 of FIGURE 1; and FIGURES 3, 4 and 5, respectively, are outlines of the cross-sectional areas of the upper air passage as taken on the lines 3—3, 4—4 and 5—5 of FIGURE 1.

FIGURE 6 is a view taken along the longitudinal center lines of air passages 8 and 10.

As shown in FIGURE 1, the engine cylinder 1 is outlined and has a longitudinal axis 2. Lying next to each other on opposite sides of the diameter 3 are the centers 4 and 5 of valves 6 and 7, respectively. A lower air passage 8 of conventional air swirl producing shape leads from its entrance 9 to valve 6. An upper air passage 10 leads from its entrance 11 to valve 7 for producing an unidirectional air flow in the cylinder.

In FIGURE 2, the entrance openings 9 and 11 lie in the same plane as indicated by the line 2—2 of FIGURE 1 and have a common housing, including the partition 12 extending between the passages. This housing is of advantage in that it can be of square cross-sectional shape having a height H. Each entrance is in the shape of a rectangle having a height $H_1$ less than its width. This rectangular shape extends through the entrance portion of passage 10 from its entrance opening 11 to at least line 3—3. From about this point, the outlet portion of the passage is so shaped as to depart from the rectangular shape of FIGURES 2 and 3 to the curved shapes of FIGURES 4 and 5 in which the height of the passage becomes greater than its width at the valve opening. These shapes are caused by the fact that the top wall 13 of upper passage 10 is lowered with respect to a plane parallel to the base of the cylinder head. The heights of air passage 10 are indicated at $H_2$, $H_3$ and $H_4$ in FIGURES 3, 4 and 5, respectively. The cross-sectional areas $F_1$ and $F_2$ of the passage 10 above and below the center line of the passage vary. The ratio of $F_1$ to $F_2$ is approximately 1 to 1 at the air passage entrance 11. This ratio changes to about 1.3 to 1 at approximately the space between lines 3—3 and 5—5, whereupon the ratio returns to about 1 to 1 near the valve opening.

Thus the path of air passage 10 has a twist through its entrance portion and outlet portion in such a manner as to have a curvature such that a hypothetical point $A_1$ in the lower right corner of FIGURE 2 follows a path extending through point $A_2$, FIGURE 3, $A_3$, FIGURE 4, and $A_4$, FIGURE 5. Point $B_1$ similarly follows a path through point $B_2$, FIGURE 3, $B_3$, FIGURE 4, $B_4$, FIGURE 5, and $B_5$, FIGURE 1. FIGURES 2 to 5 are drawn on a greater scale than FIGURE 1.

Having now described the means by which the objects of the invention are obtained, we claim:

1. In a cylinder head for a self-ignition engine operated with a unidirectional air swirl around the longitudinal axis of the engine cylinder, and having two intake valves in said head for said cylinder and for each valve a swirl producing air intake passage of the type directing the air generally in a direction tangential or nearly tangential relative to the cylinder wall, the improvement comprising each passage having an air entrance portion and an air outlet portion with the latter twisted around its respective valve and communicating with the valve opening, a partition separating the passages and extending through the outer wall of the cylinder head, and at least the air entrance portions being superimposed starting from said outer wall.

2. In a cylinder head as in claim 1, said entrance portions having a rectangular cross-sectional shape of greater width than height.

3. In a cylinder head as in claim 2, the upper of said superimposed passages having the cross-sectional shape of its outlet portion gradually increasing to a greater height than width toward the valve opening and partially wound around the outlet portion of the lower passage.

4. In a cylinder head as in claim 3, said upper passage cross-sectional areas above and below the center line of said upper passage in the ratio of 1 to 1 at the entrance to said passage, 1.3 to 1 at approximately the juncture of said entrance portion and said outlet portion, and 1 to 1 at the valve opening.

References Cited in the file of this patent
FOREIGN PATENTS 861,173    Germany _____ Dec. 29, 1952